(12) United States Patent
Gong

(10) Patent No.: US 9,815,331 B2
(45) Date of Patent: Nov. 14, 2017

(54) COMBINED TYRE

(71) Applicant: XIAMEN LENCO CO., LTD., Xiamen (CN)

(72) Inventor: Garyg Gong, Xiamen (CN)

(73) Assignee: XIAMEN LENCO CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/110,751

(22) PCT Filed: Feb. 11, 2014

(86) PCT No.: PCT/CN2014/071957
§ 371 (c)(1),
(2) Date: Jul. 11, 2016

(87) PCT Pub. No.: WO2015/120572
PCT Pub. Date: Aug. 20, 2015

(65) Prior Publication Data
US 2016/0332487 A1    Nov. 17, 2016

(51) Int. Cl.
| B60C 7/12 | (2006.01) |
| B60C 7/10 | (2006.01) |
| B60C 3/00 | (2006.01) |

(52) U.S. Cl.
CPC ............... B60C 7/125 (2013.01); B60C 3/00 (2013.01); B60C 7/10 (2013.01); B60C 7/102 (2013.01)

(58) Field of Classification Search
CPC .... B60C 7/08; B60C 7/10; B60C 7/12; B60C 7/18; B60C 7/22; B60C 7/102; B60C 17/00; B60C 17/04; B60C 17/06; B60C 3/00; B60C 7/125
See application file for complete search history.

(56) References Cited

U.S. PATENT DOCUMENTS

| | | | | |
|---|---|---|---|---|
| 1,425,085 A * | 8/1922 | Gammeter | ............ | B29D 30/02 152/394 |
| 1,531,712 A * | 3/1925 | Meade | ................ | B29D 30/02 152/327 |
| 1,618,129 A * | 2/1927 | Overman | ............... | B60C 7/12 152/325 |
| 1,687,330 A * | 10/1928 | McFarlin | ............ | B60C 7/12 152/327 |
| 4,300,613 A * | 11/1981 | Connelly | ............... | B60C 7/12 152/159 |
| 4,493,355 A * | 1/1985 | Ippen | .................... | B29D 30/02 152/310 |
| 5,520,232 A * | 5/1996 | Fukutake | ............. | B60C 7/102 152/267 |
| 2005/0247389 A1* | 11/2005 | Fukunaga | ............... | B60C 7/00 152/302 |

* cited by examiner

*Primary Examiner* — Joseph S Del Sole
*Assistant Examiner* — Cedrick Williams
(74) *Attorney, Agent, or Firm* — Leong C. Lei

(57) ABSTRACT

Disclosed is a combined tire, including a tire casing and a core. The tire casing is an annular member having a core groove around the periphery; the core is an annular member nested within the core groove of the tire casing in an interference fit, and forms a gap with the inner wall of the core groove of the tire casing. The present invention can ensure high production efficiency. The tire casing and the core of the present invention can employ materials of different hardness, offering better comfort.

2 Claims, 4 Drawing Sheets

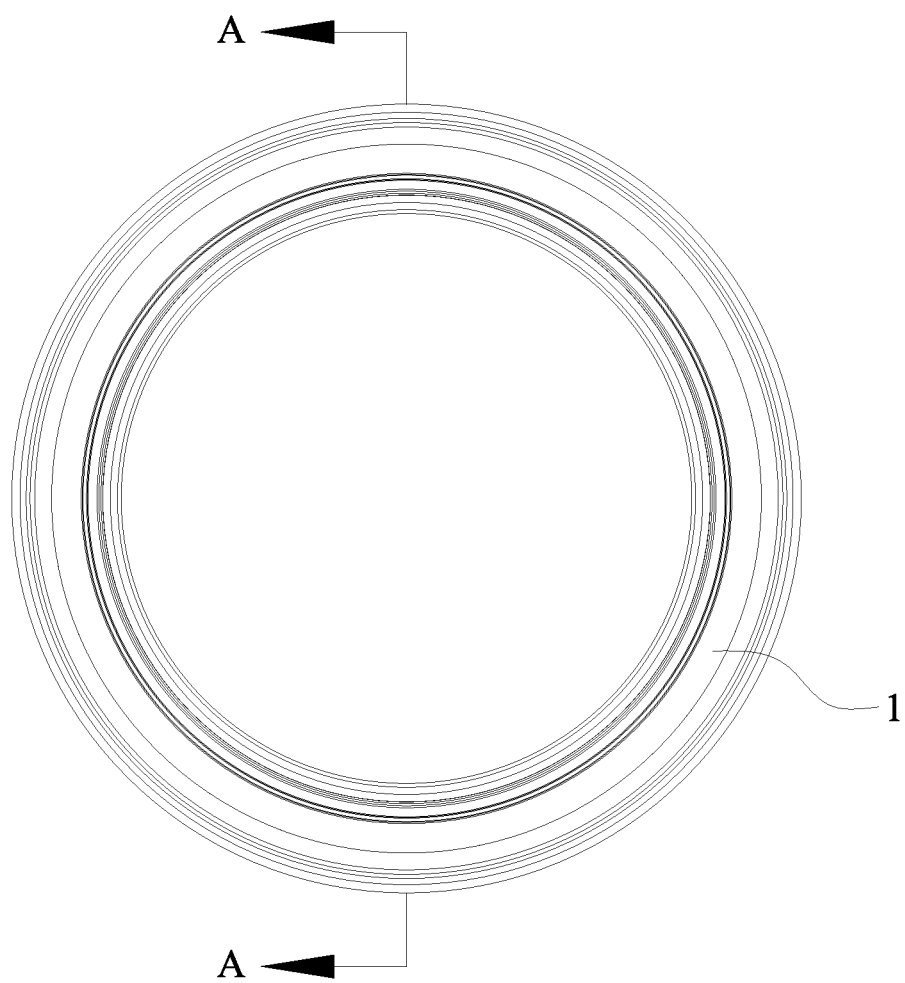
F I G. 3

COMBINED TYRE

BACKGROUND OF THE INVENTION

1. Field of the Invention

The present invention relates to a tyre, and more particularly to a combined tyre.

2. Description of the Prior Art

A solid tyre is made of rubber and a foam material. Even it is used on an uneven road, it won't have a flat tyre. It is safe for use. However, the degree of deformation of the solid tyre is small. During driving, when the tyre encounters stones or other projections, the solid tyre directly transmits the acting force to the hub. This makes the driver uncomfortable. Chinese Patent Publication No. CN 201010107905.0 discloses a method to manufacture a hollow solid tyre, as shown in FIG. 1. The method comprises the following steps: assembling a plurality of molds to form a mold core 2', fixing the mold core 2' in a tyre forming mold 1'; buckling an upper mold 11' and a lower mold 12', injecting foam liquid through an injection hole 13' into the space between the inner wall of the mold 1' and the mold core 2' and solidifying the foam liquid; taking the tyre 10' and the mold core 2' from the mold 1', disassembling the mold 1' to take out the mold parts so as to form a hollow solid tyre. During injection and forming, the hollow space is formed by combination of the detachable mold core 2' and the foam material, and then the mold core 2' is taken out one by one. The opening of the inner cavity of the tyre 10' manufactured by this method is smaller to hold the mold core 2' tightly. It is very difficult to disassemble the mold core 2' from the tyre 10', so the production efficiency is low. When in use, water and foreign objects may enter the conventional tyre 10' easily through the middle opening The bounce force from the ground directly acts on the hub through the tyre 10' so the comfort is not good. Foreign objects, such as stones, may enter this hollow solid tyre easily because of the existence of the opening Accordingly, the inventor of the present invention has devoted himself based on his many years of practical experiences to solve these problems.

SUMMARY OF THE INVENTION

The primary object of the present invention is to provide a combined tyre which has better comfort and can be mounted easily.

In order to achieve the aforesaid object, the combined tyre of the present invention comprises a tyre casing and a core. The tyre casing is an annular member having a core groove around a periphery thereof The core is an annular member nested within the core groove of the tyre casing in an interference fit. A gap is defined between an inner wall of the core groove of the tyre casing and the core.

Preferably, two sides of the core groove of the tyre casing extend inward to form flanges respectively. The core has a stepped cross-section. A stepped surface of the core is engaged with the flanges of the core groove of the tyre casing.

Preferably, an annular outer wall of the core is formed with an annular arc recess.

The present invention has the following advantages:

1. The present invention is composed of the tyre casing and the core. The core is disposed in the core groove of the tyre casing to prop up the inner cavity of the tyre casing, so that the opening of the core groove of the tyre casing can be opened larger. During the production procedure of the present invention, the mold core to form the core groove of the tyre casing can be taken out easily to enhance the production efficiency.
2. The present invention is composed of the tyre casing the core. The gap is defined between the inner wall of the core groove of the tyre casing and the core. The gap can be adjusted according to the demand, providing a better cushioning effect. The hardness of the materials for the tyre casing and the core of the present invention can be different. The comfort of the tyre is better.
3. The tyre casing and the core of the present invention are engaged with each other through a stepped surface. The engagement is firm, without disengagement.
4. The combined tyre of the present invention is composed of the tyre casing and the core, the inner cavity of the tyre casing is isolated from getting contact with the outside, so that water and foreign objects won't enter the inner cavity of the tyre.
5. The core of the present invention is made to become a standard part. PU tyre casings have different materials and patterns. Different PU tyre casings cooperate with the standard core to form different tyres.

BRIEF DESCRIPTION OF THE DRAWINGS

FIG. 3 is a front view of the present invention; and

DETAILED DESCRIPTION OF THE PREFERRED EMBODIMENTS

Embodiments of the present invention will now be described, by way of example only, with reference to the accompanying drawings.

Figure 1:
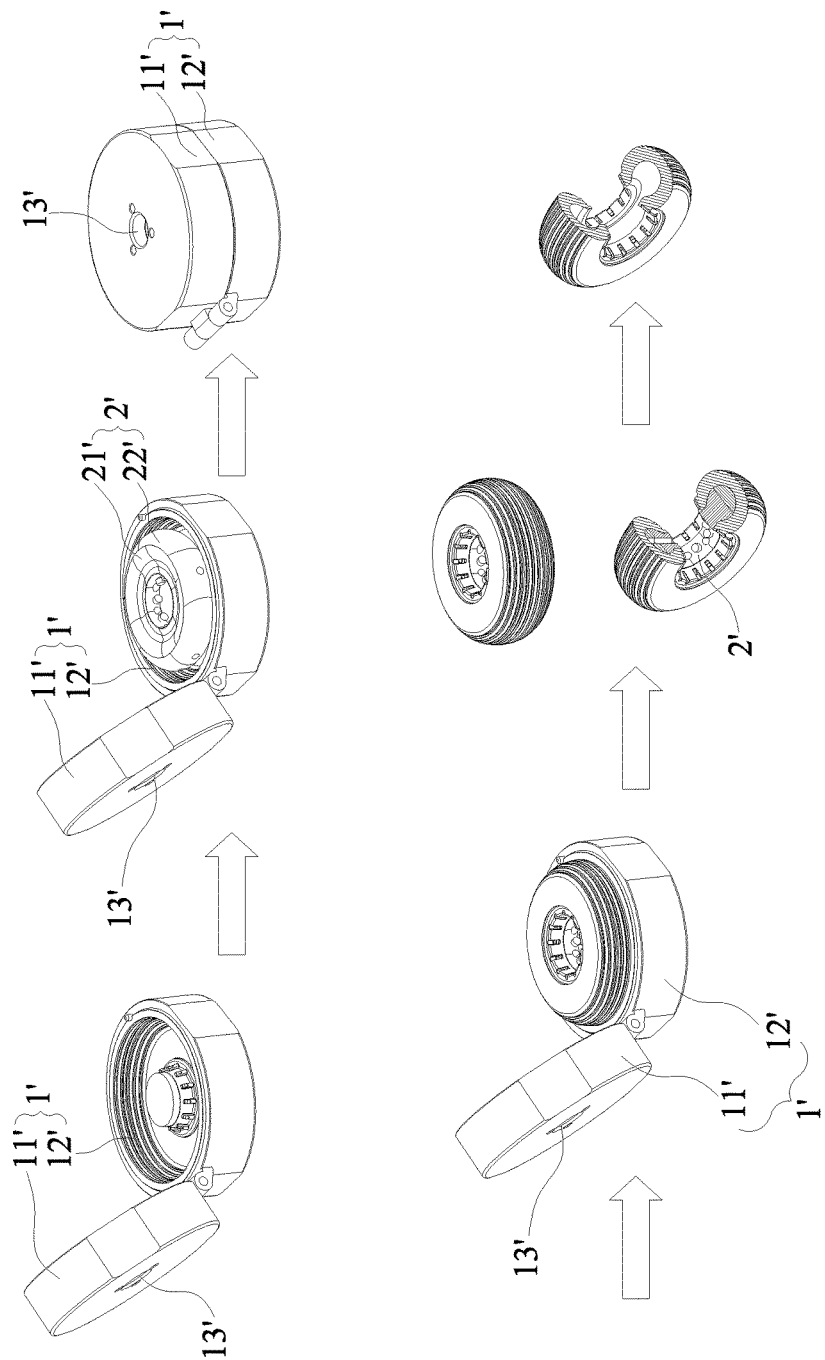
FIG. 1 is a flow chart of the method to manufacture a conventional hollow solid tyre.
Figure 2:
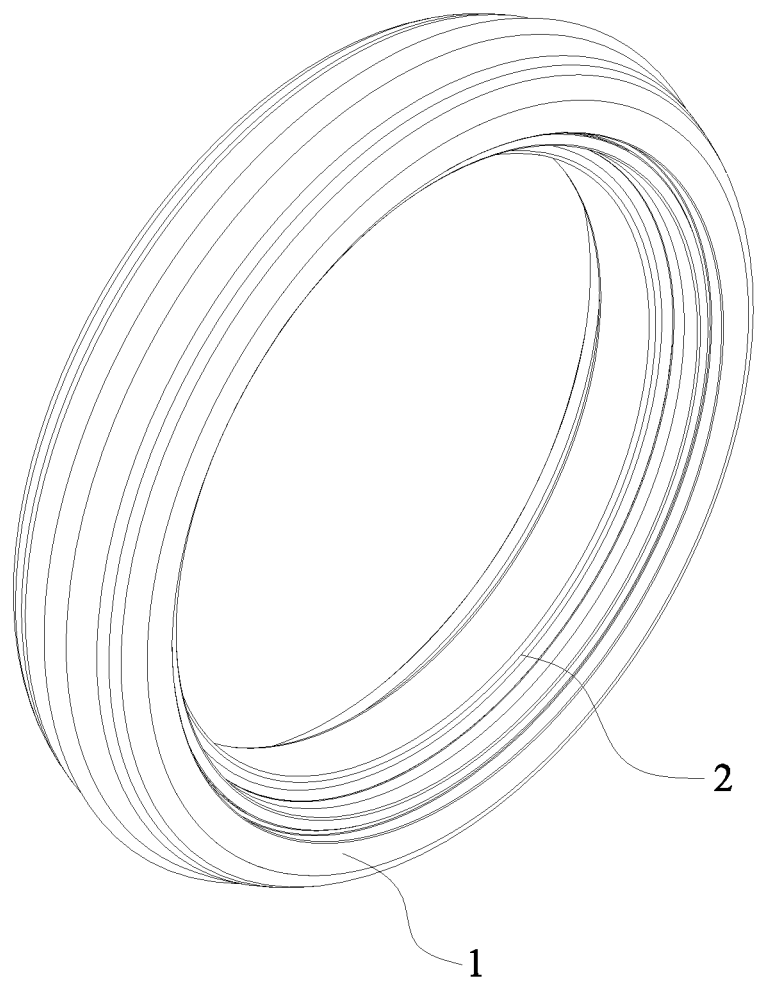
FIG. 2 is a perspective view of the present invention.
Figure 4:
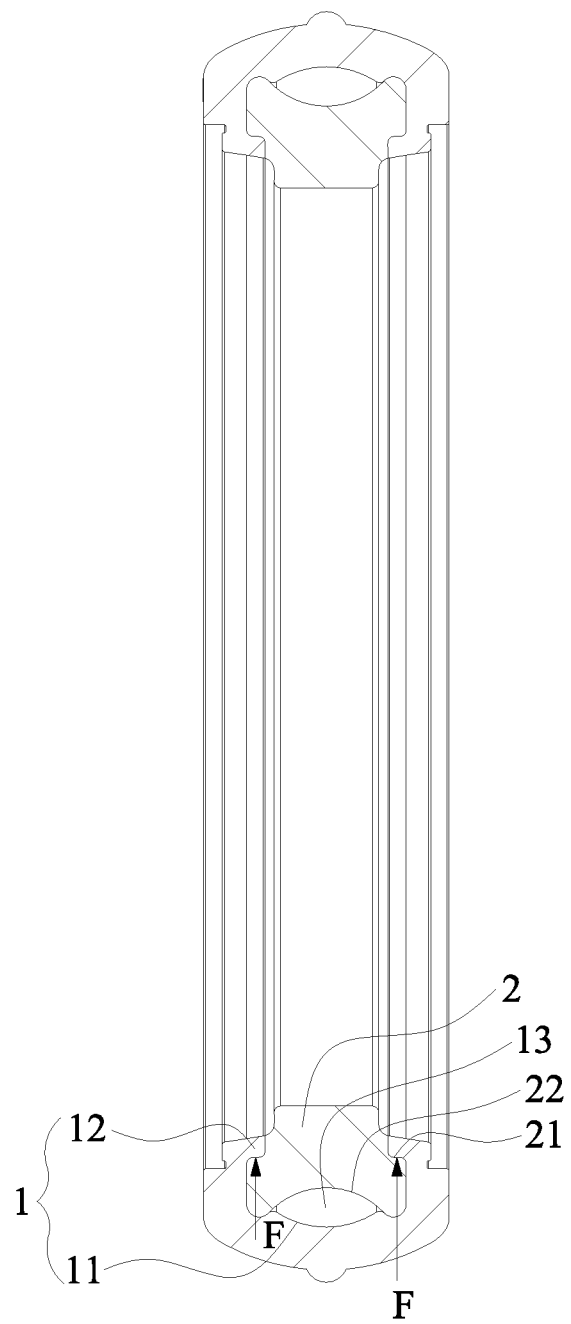
FIG. 4 is a sectional view taken along line A-A of FIG. 3.

As shown in FIG. 2 to FIG. 4, the present invention discloses a combined tyre. The combined tyre comprises a tyre casing 1 and a core 2. The tyre casing 1 is an annular member having a core groove 11 around the periphery thereof Two sides of the core groove 11 of the tyre casing 1 extend inward to form flanges 12, respectively. The flanges 12 constitute the tyre beads of the tyre.

The core 2 is an annular member. The core 2 has a stepped cross-section. When the core 2 is nested within the core groove 11 of the tyre casing 1 in an interference fit, a gap 13 is defined between the inner wall of the core groove 11 of the tyre casing 1 and the core 2. A stepped surface 21 of the core 2 is engaged with the flanges 12 of the core groove 11 of the tyre casing 1 to form a tightening force F to compress the flanges 12 inward. When the tyre is mounted on a hub, the tightening force F enables the tyre bead of the tyre to fit on the hub tightly, so that the tyre won't fall off. This can prevent the tyre casing 1 from disengaging from the core 2 effectively after the tyre casing 1 is compressed to expand outward.

The annular outer wall of the core 2 is formed with an annular arc recess 22. The depth of the arc recess 22 corresponds in size to the gap 13 defined between the inner wall of the core groove 11 of the tyre casing 1 and the core 2. When the gap 13 is larger, the hardness of the tyre is lower. On the contrary, when the gap 13 is smaller, the hardness of the tyre is higher.

The feature of the present invention is that the tyre is composed of the tyre casing and the core fitted in the tyre casing.

The aforesaid is just a preferred embodiment of the present invention. The thickness and pattern of the tyre casing can be changed according to the demand Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A combined tyre, comprising a tyre casing and a core; the tyre casing being an annular member having a core groove around a periphery thereof; the core being an annular member nested within the core groove of the tyre casing in an interference fit, a gap being defined between an inner wall of the core groove of the tyre casing and the core;

wherein an annular outer wall of the core is formed with an annular arc recess defined by a single continuous arc curve spanning between two opposite sides of the core and corresponding to and radially spaced from a curved surface of the core groove of the tyre casing such that the gap is defined by the arc curve of the annular arc recess of the core and the curved surface of the core groove of the tyre casing; and wherein the two opposite sides of the core groove of the tyre casing extend inward to form flanges each of which is spaced from and opposite to a portion of the inner wall of the core groove of the tyre casing, and the core that is nested within the core groove of the tyre casing such that the two opposite sides respectively are sandwiched between the flanges and the portions of the inner wall of the core groove of the tyre casing.

2. The combined tyre as claimed in claim 1, wherein each of the two opposite sides of the core has a stepped cross-section, which has a stepped surface engaged with the flanges of the core groove of the tyre casing.

* * * * *